US006889709B2

(12) United States Patent
Hanada et al.

(10) Patent No.: US 6,889,709 B2
(45) Date of Patent: May 10, 2005

(54) MANIFOLD VALVE

(75) Inventors: Toshihiro Hanada, Nobeoka (JP);
Takeshi Hamada, Nobeoka (JP)

(73) Assignee: Asahi Organic Chemicals Industry Co., Ltd., Nobeoka (JP)

( * ) Notice: Subject to any disclaimer, the term of this patent is extended or adjusted under 35 U.S.C. 154(b) by 8 days.

(21) Appl. No.: 10/344,946

(22) PCT Filed: Jun. 18, 2002

(86) PCT No.: PCT/JP02/06060
§ 371 (c)(1),
(2), (4) Date: Feb. 19, 2003

(87) PCT Pub. No.: WO03/001093
PCT Pub. Date: Jan. 3, 2003

(65) Prior Publication Data
US 2003/0155024 A1 Aug. 21, 2003

(30) Foreign Application Priority Data

Jun. 21, 2001  (JP) ........................................ 2001-188657
Jul. 10, 2001  (JP) ........................................ 2001-209691

(51) Int. Cl.⁷ ............................................. F16K 11/10
(52) U.S. Cl. ........................ 137/606; 137/883; 251/331
(58) Field of Search .............................. 137/606, 884, 137/883; 251/331

(56) References Cited
U.S. PATENT DOCUMENTS 6,192,932 B1 * 2/2001 Izumo et al. ............... 137/606

FOREIGN PATENT DOCUMENTS

| JP | 63-62976 A | 3/1988 |
| JP | 5-19746 U | 3/1993 |
| JP | 5-106749 A | 4/1993 |
| JP | 6-281026 A | 10/1994 |
| JP | 8-5000 A | 1/1996 |
| JP | 10-292871 A | 11/1998 |
| JP | 2000-314500 A | 11/2000 |
| JP | 2000-320700 A | 11/2000 |

* cited by examiner

Primary Examiner—John Fox
(74) Attorney, Agent, or Firm—Burns, Doane, Swecker & Mathis, L.L.P.

(57) ABSTRACT

A manifold valve of the invention comprises a body and respective actuators driving a plurality of valve bodies arranged within the body. The body having a valve chamber on the main flow passage side and a valve chamber on the secondary flow passage side which are communicated with each other by a connecting flow passage, and further having a main flow passage communicating with a communicating port arranged on the bottom center of the valve chamber on the main flow passage side, a branched flow passage communicating with the valve chamber on the main flow passage side, and a secondary flow passage communicating with a communicating port arranged on the bottom center of the valve chamber on the secondary flow passage side. The communicating ports on the sides of the main flow passage and the secondary flow passage are respectively provided with opening and closing valve bodies driven by the actuators.

12 Claims, 18 Drawing Sheets

MANIFOLD VALVE

TECHNICAL FIELD

The present invention relates to a manifold valve having a main flow passage, a secondary flow passage and a branched flow passage, as well as a manifold valve having a main flow passage, a secondary flow passage, a branched flow passage and a circulating flow passage, and more particularly to a manifold valve in which a fluid stagnating area is very small, a superior cleaning effect is obtained and a compact piping line is achieved.

BACKGROUND ART

Hitherto, in a line supplying a fluid from a main flow passage in a branched manner in a slurry line in the semiconductor industry or various chemical liquid lines, and in a line supplying a fluid from a main flow passage in a branched manner and circulating the fluid, for the purpose of preventing from occurrence of troubles, such as the condensation/solidification of a slurry or the depositing of crystals and the like, there has been often provided a line for cleaning the branched flow passage.

In such case, generally, there have been adopted a method of combining two two-way valves 55, 56 and two T-pipes 53, 54 as shown in FIG. 17, a method of combining a three-way valve 65, a two-way valve 61 and a T-pipe 60 as shown in FIG. 18, a method of combining three two-way valves 154, 156, 157 and two T-pipes 153, 155 as shown in FIG. 19, and a method of combining a three-way valve 162, two two-way valves 164, 165 and a T-pipe 163 as shown in FIG. 20.

However, in the case shown in FIG. 17, there are caused a problem that a chemical liquid stagnates in the flow passage from the T-pipe 53 to the two-way valve 55 and a problem that the flow passage from the two-way valve 55 to the T-pipe 54 is not sufficiently cleaned when cleaning. Also, in the case shown in FIG. 18, there is similarly caused a problem that the flow passage from the three-way valve 65 to the T-pipe 60 is not sufficiently cleaned.

Further, in the case shown in FIG. 19, there are caused a problem that a chemical liquid stagnates in the flow passage from the T-pipe 53 to the two-way 54 and a problem that the flow passage from the two-way valve 154 to the T-pipe 155 is not sufficiently cleaned when cleaning. Also, in the case shown in FIG. 20, there is similarly caused a problem that the flow passage from the three-way valve 162 to the T-pipe 163 is not sufficiently cleaned.

DISCLOSURE OF THE INVENTION

The present invention has been conceived in view of the problems of the prior art as stated above, and the purpose of this invention is to provide a manifold valve in which a fluid stagnating area is very small, a superior cleaning effect is obtained and a compact piping line is achieved.

In order to achieve the above purpose, according to the present invention, as a manifold valve for a line supplying a fluid from a main flow passage in a branched manner, there is provided a manifold valve comprising a body having a main flow passage side valve chamber and a secondary flow passage side valve chamber which are communicated with each other by a connecting flow passage, a main flow passage communicated with a main flow passage side communicating port arranged on the center of the bottom of the main flow passage side valve chamber, a branched flow passage communicated with the main flow passage side valve chamber, and a secondary flow passage communicated with a secondary flow passage side communicating port arranged on the center of the bottom of the secondary flow passage side valve chamber; and actuators having valve bodies which open and close the main flow passage side communicating port and the secondary flow passage side communicating port, respectively (hereinafter referred to as a first invention).

In a preferred embodiment of the present invention, the branched flow passage and the connecting flow passage are arranged in a direction perpendicularly intersecting the main flow passage, and the secondary flow passage is arranged parallel to the branched flow passage and, in another embodiment, the branched flow passage and the connecting flow passage are arranged in a direction perpendicularly intersecting the main flow passage, and the secondary flow passage is arranged parallel to the main flow passage.

Also, in the present invention, the main flow passage is arranged on one side of the body or to penetrate the body.

Further, according to the present invention, as a manifold valve for a line supplying a fluid from the main flow passage in a branched manner and circulating the fluid, there is provided a manifold valve comprising a body having three valve chambers composed of a main flow passage side valve chamber, a secondary flow passage side valve chamber and a circulating flow passage side valve chamber, a connecting flow passage communicating the main flow passage side valve chamber and the secondary flow passage side valve chamber, a main flow passage communicated with both a main flow passage side communicating port arranged on the center of the bottom of the main flow passage side valve chamber and a circulating flow passage side communicating port arranged on the center of the bottom of the circulating flow passage side valve chamber, a branched flow passage communicated with the main flow passage side valve chamber, a secondary flow passage communicated with a secondary flow passage side communicating port arranged on the center of the bottom of the second flow passage side valve chamber, and a circulating flow passage communicated with the circulating flow passage side valve chamber; and actuators having valve bodies which open and close the main flow passage side communicating port, the secondary flow passage side communicating port and the circulating flow passage side communicating port, respectively (hereinafter referred to as a second invention).

Also, in a preferred embodiment of the above invention, the branched flow passage, the connecting flow passage and the secondary flow passage are arranged in a direction perpendicularly intersecting the main flow passage.

Further, in another embodiment, the branched flow passage and the connecting flow passage are arranged in a direction perpendicularly intersecting the main flow passage, and the secondary flow passage is arranged parallel to the main flow passage.

Also, in the above invention, the bottom surfaces of the branched flow passage, the main flow passage side valve chamber, the connecting flow passage and the secondary flow passage side valve chamber are formed to be flush with each other, and the bottom surfaces of the circulating flow passage and the circulating flow passage side valve chamber are formed to be flush with each other.

BEST MODE OF CARRYING OUT THE INVENTION

Embodiments of the present inventions will be explained below with reference to the drawings.

Figure 1:
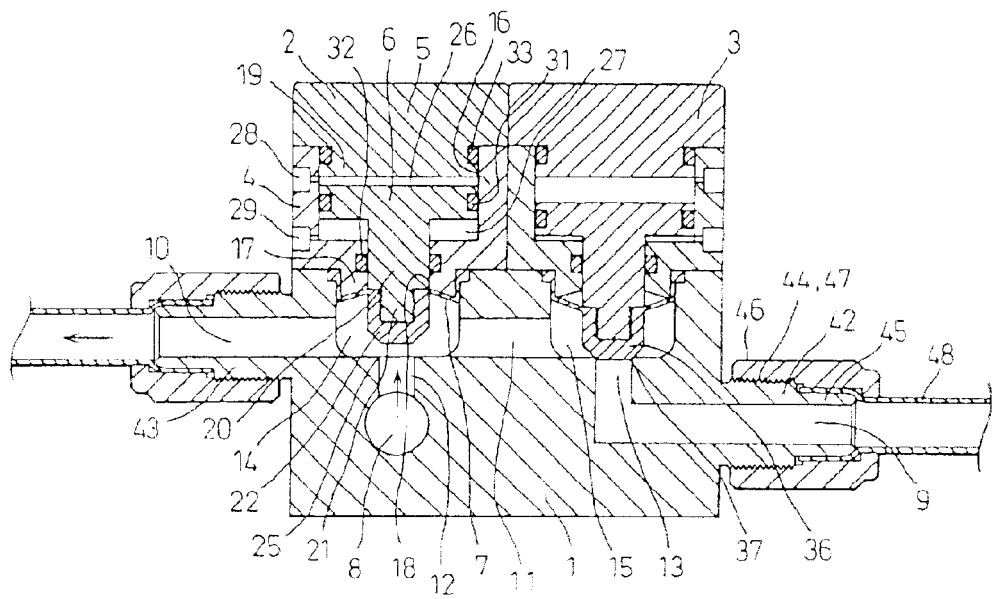
FIG. 1 is a longitudinal cross section showing a first embodiment of the first invention.
Figure 2:
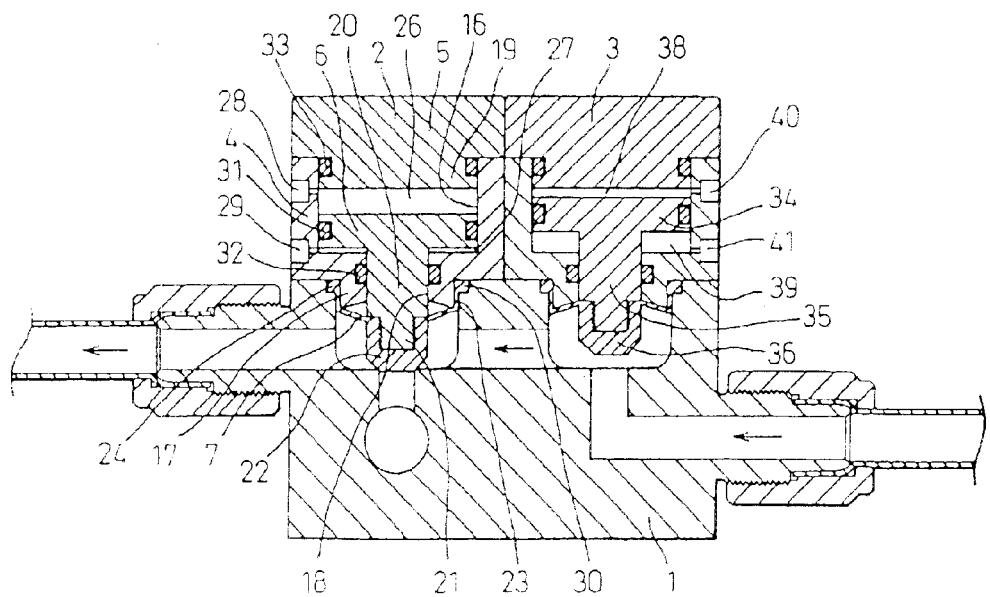
FIG. 2 is a longitudinal cross section showing the condition where a main flow passage side communicating port is closed and a secondary flow passage side communicating port is opened.
Figure 3:
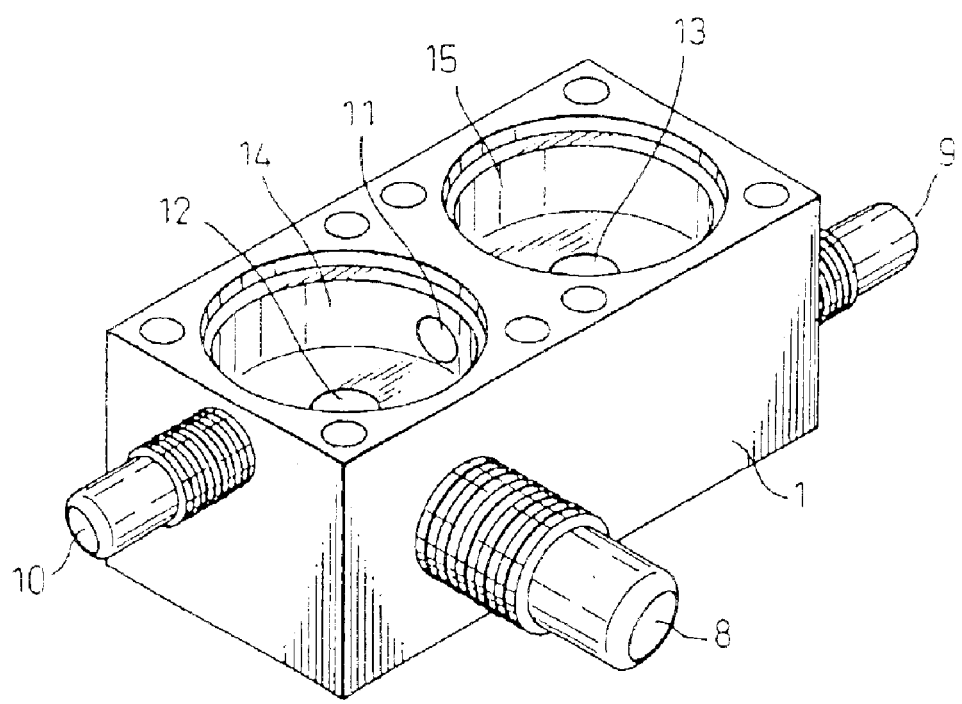
FIG. 3 is a perspective view of a body in FIG. 1.
Figure 4:
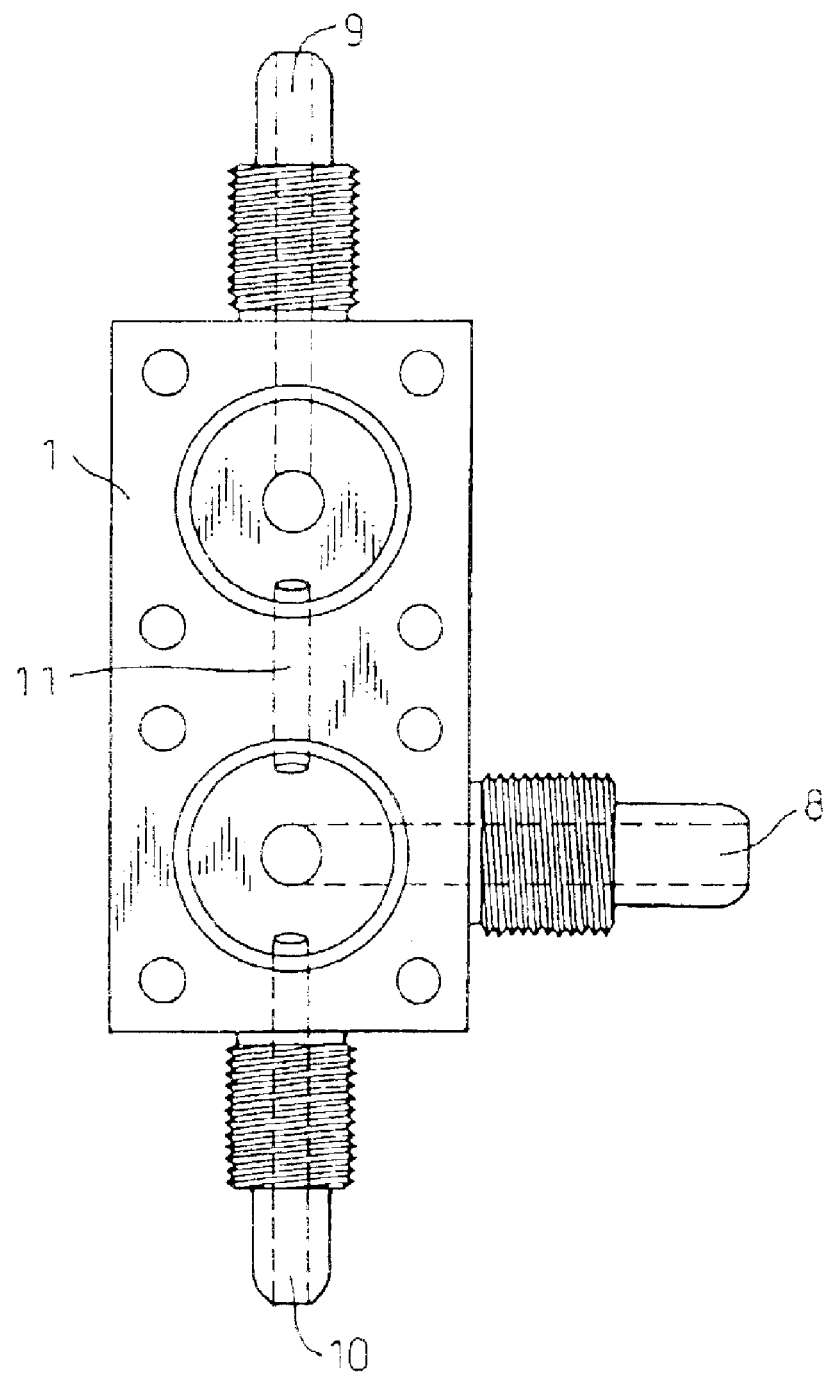
FIG. 4 is a plan view of a body in FIG. 3.
Figure 5:
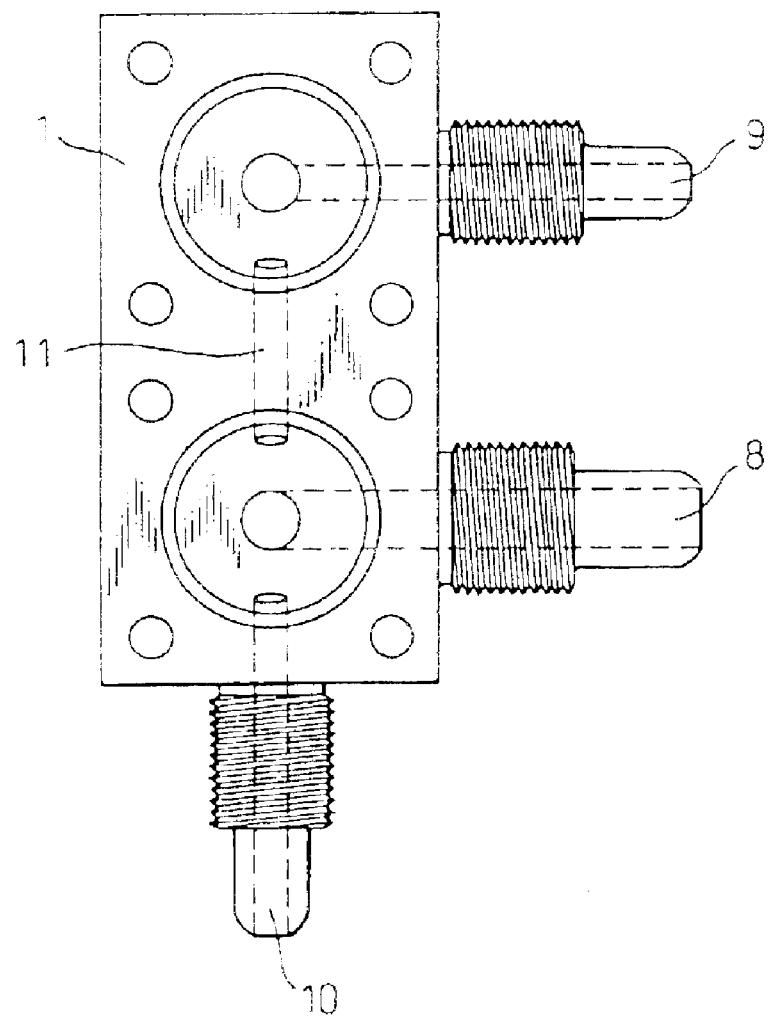
FIG. 5 is a plan view of only a body showing a second embodiment of the first invention.
Figure 6:
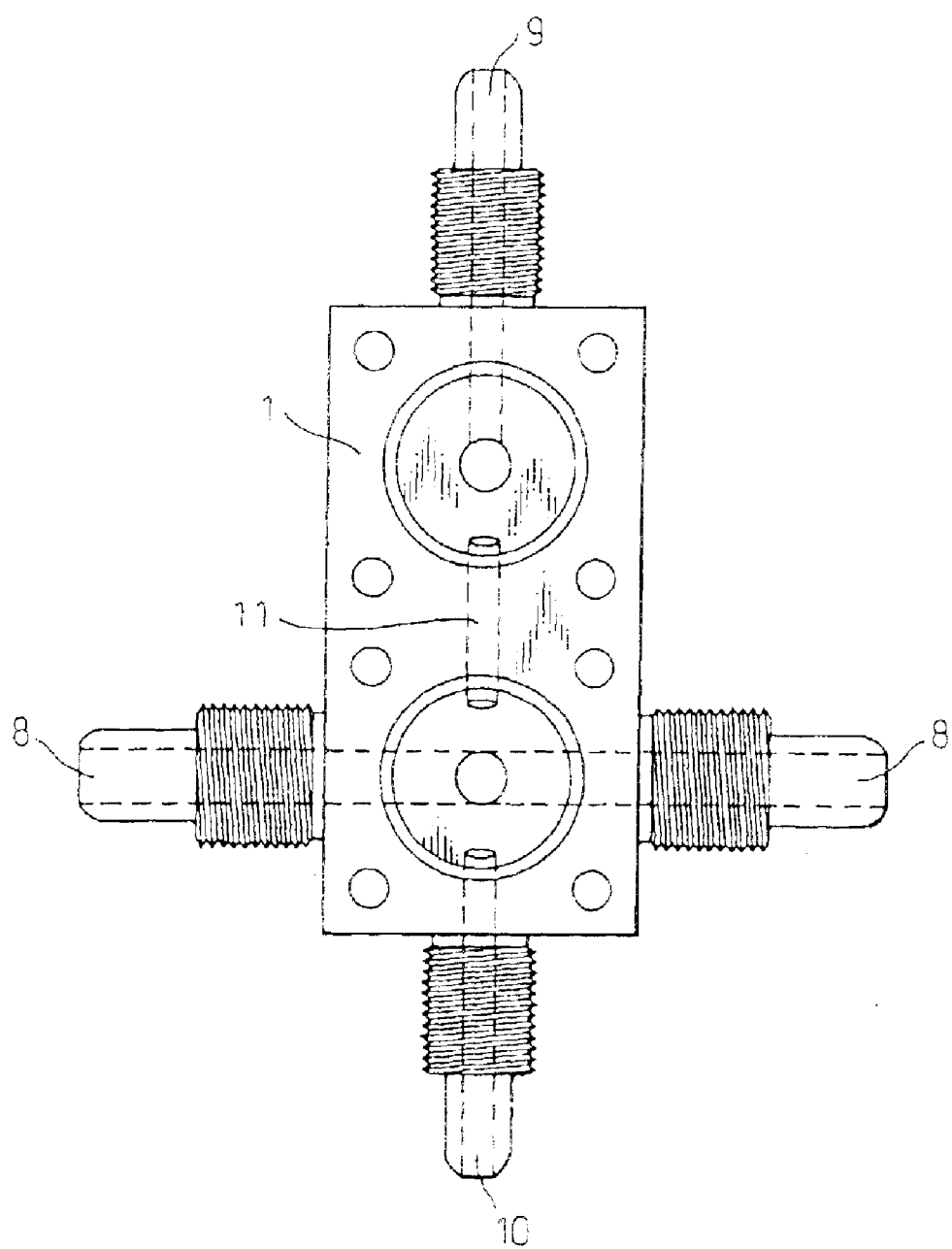
FIG. 6 is a plan view of only a body showing a third embodiment of the first invention.
Figure 7:
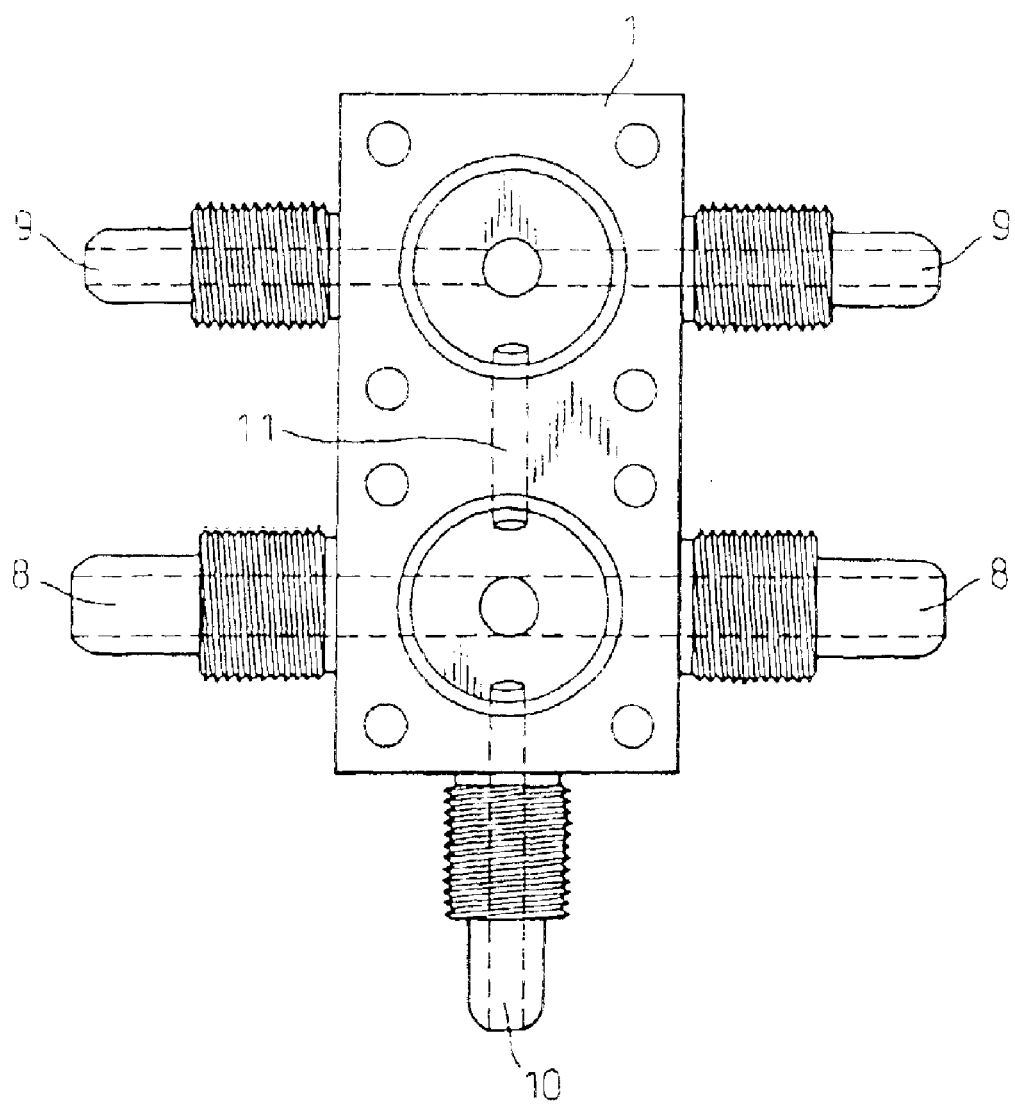
FIG. 7 is a plan view of only a body showing a fourth embodiment of the first invention.

FIGS. 1 to 7 show the embodiments of the first invention, and FIG. 1 is a longitudinal cross section of a manifold valve according to the first invention where a main flow passage side is opened and a secondary flow passage side is closed. FIG. 2 is a longitudinal cross section showing the manifold valve in FIG. 1 where the main flow passage side is closed and the secondary flow passage side is opened. FIG. 3 is a cubic perspective view of a body in FIG. 1. FIG. 4 is a plan view of the body in FIG. 3. FIG. 5 is a plan view of the body in a second embodiment of the manifold valve according to the first invention. FIG. 6 is a plan view of the body in a third embodiment of the manifold valve according to the first invention. FIG. 7 is a plan view of the body is a fourth embodiment of the manifold valve according to the first invention.

In the drawings, reference numeral 1 designates a body on the upper portion of which are provided a cylindrical main flow passage side valve chamber 14 and a cylindrical secondary flow passage side valve chamber 15 which are communicated with each other by a connecting flow passage 11. Reference numeral 8 designates a main flow passage communicating with only a main flow passage side communicating port 12 arranged on the center of the bottom of the main flow passage side valve chamber 14. Namely, as shown in FIG. 3, the main flow passage is arranged on only one side of the body. Reference numeral 9 designates a secondary flow passage communicating with a secondary flow passage side communicating port 13 arranged on the center of the bottom of the secondary flow passage side valve chamber 15, in a perpendicular direction. Reference numeral 10 designates a branched flow passage communicating with the main flow passage side valve chamber 14 and located on the side of the body 1 opposite to the secondary flow passage 9. The connecting flow passage 11 is formed such that the bottom surface thereof is flush with the bottom surfaces of both valve chambers 14 and 15, and also the branched flow passage 10 is formed such that the bottom surface thereof is flush with the bottom surface of the main flow passage side valve chamber 14. Thus, there is no fluid stagnating area in the valve chambers, the connecting flow passage and the branched flow passage. As seen in FIGS. 1 to 3, the main flow passage 8 is located in a direction perpendicularly intersecting the secondary flow passage 9, the branched flow passage 10 and the connecting flow passage 11. Namely, the secondary flow passage 9, the branched flow passage 10 and the connecting flow passage 11 are located such that these flow passages are parallel to each other. Also, the edges of openings or the peripheral portions of the main flow passage side communicating port 12 and the secondary flow passage side communicating port 13 are formed with valve seat portions 25, 37 which valve bodies 22, 36 of actuators 2, 3 referred to later are pressed on and separated from. The diameter of the main flow passage side valve chamber 14 is larger than those of the main flow passage side communicating port 12 and the valve body 22, and similarly the diameter of the secondary flow passage side valve chamber 15 is larger than those of the secondary flow passage side communicating port 13 and the valve body 36.

In this embodiment, on both sides of the body 1 are integrally formed coupling portions 42 and 43 projecting from the body 1, inside which the secondary flow passage 9 and the branched flow passage 10 extend. The main flow passage 8 is also provided with such a coupling portion (see FIG. 3). In order to connect a piping tube 48 to the coupling portion 42, first the piping tube 48 is fitted on a tip 45 of the coupling portion 42, and then a female screw 47 of a cap nut 46 is screwed with a male screw 44 on the outer periphery of the coupling portion 42 to clamp the end of the piping tube 48. The main flow passage 8 and the branched flow passage 10 are also installed with piping tubes similarly. Further, as for the connecting configuration of the body 1 and the piping tube 48, it is not limited to this embodiment, the other common connecting configuration may be adopted.

The actuators 2 and 3 are fixed to the upper portion of the body 1 by penetrating bolts/nuts (not shown). Since both actuators are fixed to the body in the same manner, the actuator 2 will be representatively explained.

Reference numeral 4 designates a cylinder body which has a cylindrical cylinder portion 16 inside the cylinder body and a cylindrical projecting portion 17 on the lower surface of the cylinder body, and a through hole 18 is arranged on the center of the bottom of the cylinder portion 16 to penetrate the projecting portion 17. On the inner periphery of the through hole 18 is fitted an O-ring 32. Also, on the side surface of the cylinder body 4 are provided a pair of actuating fluid supply ports 28, 29 respectively communicating with the upper and lower portions of the cylinder portion 16.

Reference numeral 5 designates a cylinder cover which has a cylindrical projection 19 provided with an O-ring 33 on the bottom surface thereof and is joined to the cylinder body 4 by inserting the cylindrical projection 19 into the upper portion of the cylinder portion 16 via the O-ring 33. In this embodiment, three components composed of the body 1, the cylinder body 4 and the cylinder cover 5 are integrally fixed by penetrating bolts/nuts (not shown).

Reference numeral 6 designates a piston on the outer periphery of which an O-ring 31 is fitted and which is slidably inserted into the cylinder portion 16 via the O-ring 31 to move up and down. On the center of the lower end surface of the piston is integrally provided a rod portion 20 slidably penetrating and projecting in the through hole 18 of the cylinder body 4, and the tip of the rod portion 20 is provided with a joining portion 21 to which the valve body 22 of a diaphragm 7 is joined. Also, an upper space 26 is defined by the upper surface of the piston 6, the inner peripheral surface of the cylinder portion 16 and the lower surface of the cylinder cover 5, and a lower space 27 is defined by the lower surface of the piston 6, the outer peripheral surface of the rod portion 20, and the inner and bottom surfaces of the cylinder portion 16.

Reference numeral 7 designates a diaphragm on which is integrally provided at the center of the lower surface thereof with the valve body 22 pressing on and separating from the valve seat portion 25 arranged on the body 1, i.e., the periphery of the opening of the main flow passage side communicating port 12, the valve body 22 being joined to the tip of the rod portion 20 of the piston 6 by screwing. On the outer periphery of the diaphragm 7 is provided a cylindrical membrane 23, the cylindrical membrane 23 being further provided with an annular projection 24 at the outer periphery of the upper end thereof. The cylindrical membrane 23 is clamped by the inner periphery of the main flow passage side valve chamber 14 of the body 1 and the outer periphery of the projection 17 of the cylinder body 4, further the annular projection 24 is inserted into a step portion 30 arranged on the upper and inner peripheral portion of the main flow passage side valve chamber 14 of the body 1 and is champed by the inner periphery of the main flow passage side valve chamber 14 and the outer periphery of the projection 17 of the cylinder body 4. The configuration of the diaphragm 7 is not limited to this embodiment, and thus a membrane clamped by the body 1 and the cylinder portion 16 may be used and the bellows type diaphragm also may by used.

Further, as for the construction of the actuators, the construction provided with a spring inside thereof may be used as long as the actuator has a valve body opening and closing the communicating ports of the main flow passage and the secondary flow passage, and thus it is not especially limited to this embodiment. Although it is preferable to separately provide the actuators on the main flow passage side and on the secondary flow passage side, the actuators may be integrally provided on both flow passage sides, and thus the installation of the actuators is not especially limited.

Further, as a material for the body etc, fluororesin, such as polytetrafluoroethylene (hereinafter, referred to as PTFE) or tetrafluoroethylene-perfluoroalkylvinylether copolymer (hereinafter referred to as PFA) may be used, since fluororesin has a superior chemical resistant characteristic and dissolves out less impurities. However, the other plastics, such as polyvinylchloride or polyprophylene, and metal may be used, and thus the materials for the body etc. are not especially limited.

Also, as a material for the diaphragm, although fluororesin such as PTFE, PFA is preferably used, rubber and metal may be used, and thus the material is not especially limited.

Next, the operation of the manifold valve according to this embodiment will explained below.

FIG. 1 shows the condition where the main flow passage side communicating port 12 is opened and the secondary flow passage side communicating port 13 is closed. In this condition, the fluid in the main flow passage 8 flows to the branched flow passage 10, the connecting flow passage 11 and the secondary flow passage side valve chamber 15. In this condition, if an actuating fluid (for example, a compressed air etc.) is forced into the upper space 26 through the actuating fluid supply port 28 of the actuator 2 from the outside of the cylinder body, the piston 6 is pressed downward by the pressure of the actuating fluid so that the rod portion 20 joined to the piston is drawn downward, whereby the valve body 22 joined to the lower end of the rod portion 20 is pressed against the valve seat portion 25 to close the main flow passage side communicating port 12. On the other hand, if the actuating fluid is conversely forced into the lower space 39 from the actuating fluid supply port 41 of the actuator 3, the piston 34 is pushed upward by the pressure of the actuating fluid so that the rod portion 35 joined to the piston is drawn upward and the valve body 36 joined to the lower end of the rod portion 35 is separated from the valve seat portion 37, whereby the secondary flow passage side communicating port 13 becomes to the opened condition (the condition of FIG. 2).

FIG. 2 is a condition such that the communicating port 12 on the main flow passage side is closed and the communicating port 13 on the secondary flow passage side is opened. In this condition, the fluid in the secondary flow passage 9 flows to the secondary flow passage side valve chamber 15, the connecting flow passage 11, the main flow passage side valve chamber 14 and the branched flow passage 10. In this condition, if the actuating fluid (for example, a compressed air, etc.) is poured to the upper space 38 through the actuating fluid supply port 40 of the actuator 3 from the outside of the actuator, the piston 34 is pressed downward by the pressure of the actuating fluid, so that the rod portion 35 joined to the piston is drawn downward and the valve body 36 joined to the lower end of the rod portion 35 is pressed against the valve seat portion 37, whereby the communicating port 13 on the secondary flow passage side becomes to the closed condition. On the other hand, if the actuating fluid is conversely poured to the lower space 27 from the actuating fluid supply port 29 of the actuator 2, the piston 6 is pushed upward by the pressure of the actuating fluid, so that the rod portion 20 joined to the piston is drawn upward and the valve body 22 joined to the lower end of the rod portion 20 is separated from the valve seat portion 25, whereby the communicating port 12 on the main flow passage side becomes to the opened condition (the condition of FIG. 1).

For example, in the case that the valve according to this embodiment is used in a line where a slurry is supplied from the main flow passage 8 side, a cleaning liquid is supplied from the secondary flow passage 9 side and they are discharged from the branched flow passage 10, in the condition of FIG. 1 the slurry is discharged from the branched flow passage 10 through the valve chamber 14 on the main flow passage side, but the slurry is stagnated in the connecting flow passage 11 and the valve chamber 15 on the secondary flow passage side. In this condition, however, if the communicating port 12 on the main flow passage side is closed, the communicating port 13 on the secondary flow passage side is opened (the condition of FIG. 2) and the cleaning liquid flows from the secondary flow passage 9 side and the stagnating slurry is discharged from the branched flow passage 10 so that the interior of the valve can be cleaned. In this embodiment, as the bottom surfaces of the branched flow passage 10, the valve chamber 14 on the main flow passage side, the connecting flow passage 11 and the valve chamber 15 on the secondary flow passage side are designed to be flush with each other as stated above, the volume of the stagnating area is very small and, as the respective flow passages are formed in straight lines, the pressure loss is low, and thus a superior cleaning effect can be obtained.

FIG. 4 is a plan view of FIG. 3 shown for reference.

FIG. 5 is a plan view of only a body 1 showing a second embodiment of the present invention. The difference from the first embodiment is that a secondary flow passage 9 is arranged on the same side of the body 1 parallel to the main flow passage 8. As for the operation of the second embodiment, the flow direction of the fluid flowing in the secondary flow passage 9 is only changed to a direction perpendicularly to the connecting flow passage 11, thus the explanation of the operation will be omitted since the operation is the same as that of the first embodiment.

FIG. 6 is a plan view of only a body 1 showing a third embodiment of the present invention. The difference from the first embodiment is that a main flow passage 8 is arranged to penetrate a body 1. As the fluid in the main flow passage 8 continuously flows or circulates even if the communicating part 12 on the main flow passage side is closed, even if a fluid having high precipitation characteristic, such as a slurry, flows in the main flow passage 8, it is not likely that the slurry is precipitated. As for the operation in the other conditions, as it is the same as in the first embodiment, the explanation of it will be omitted.

Figure 8:
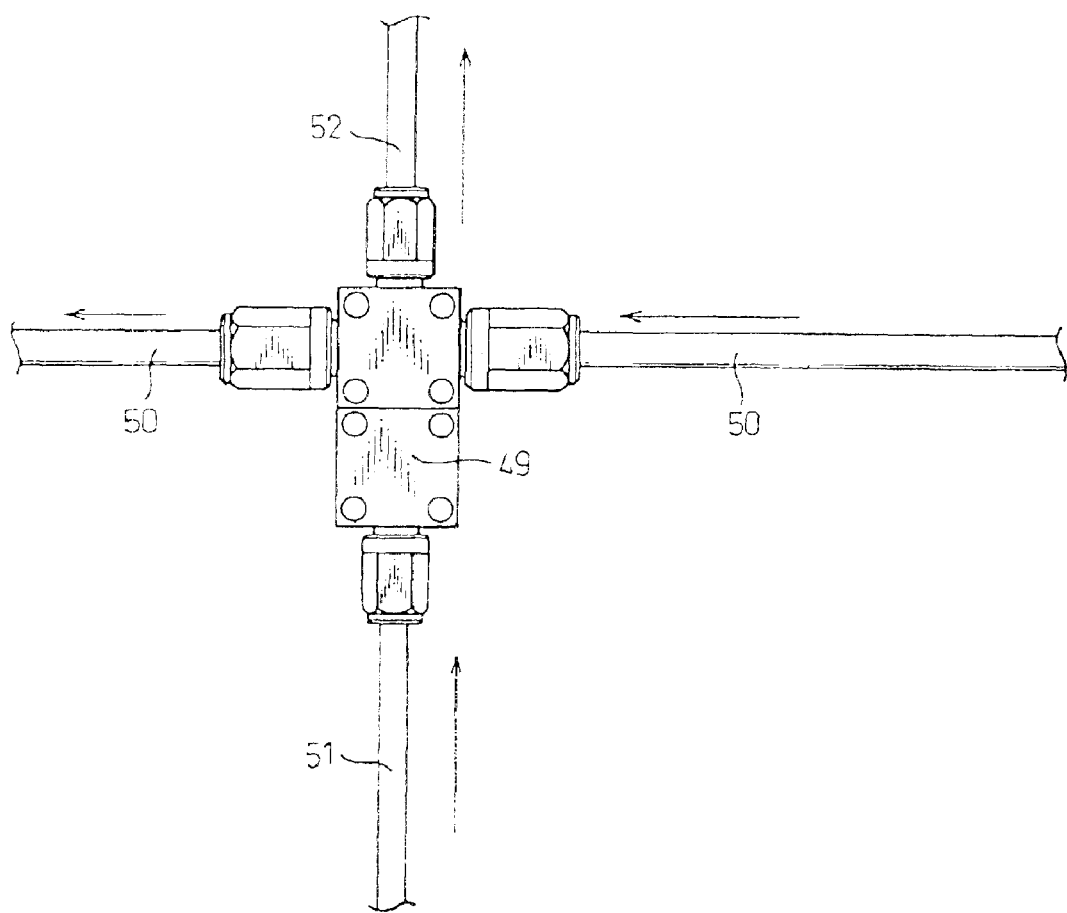
FIG. 8 is an external appearance view showing a branched supply line for a chemical liquid using the third embodiment of the first invention.
Figure 17:
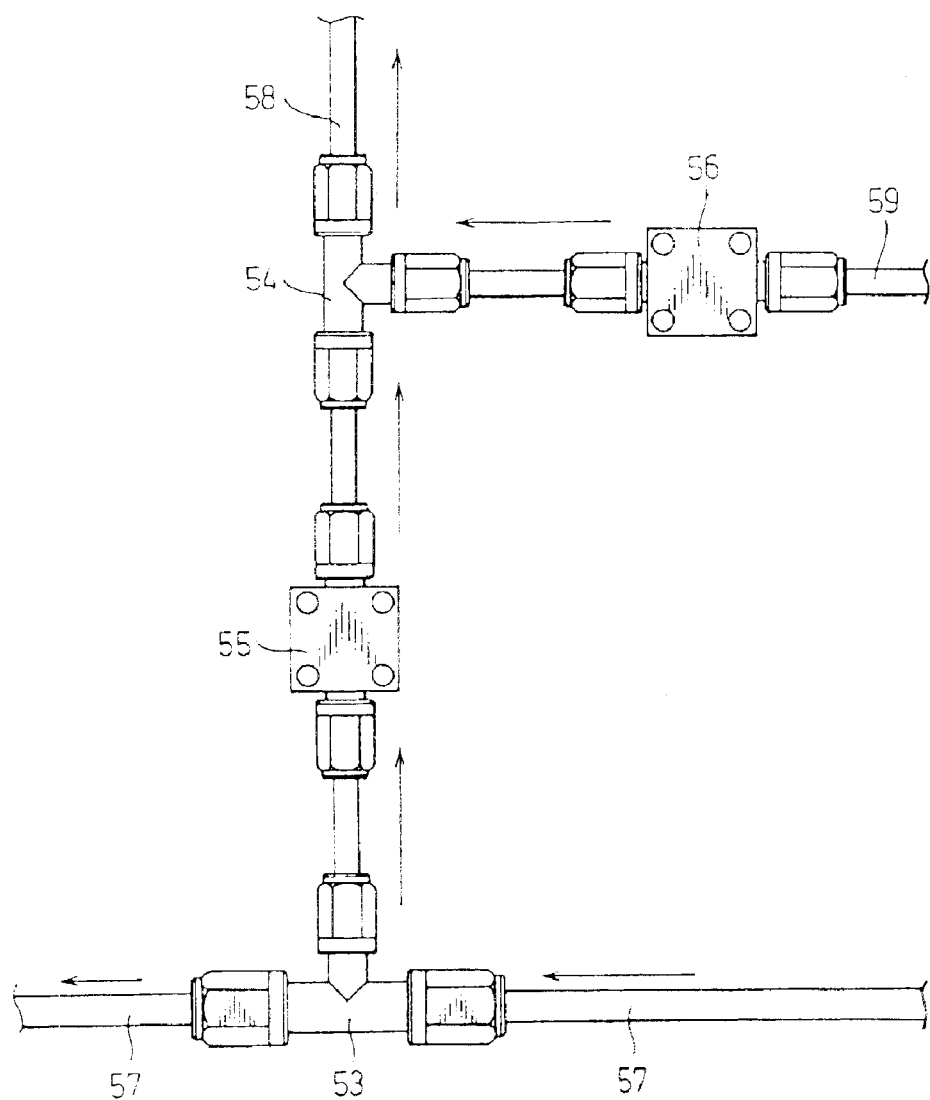
FIG. 17 is an external appearance view showing a prior art branched supply line for a chemical liquid using tow-way valves.
Figure 18:
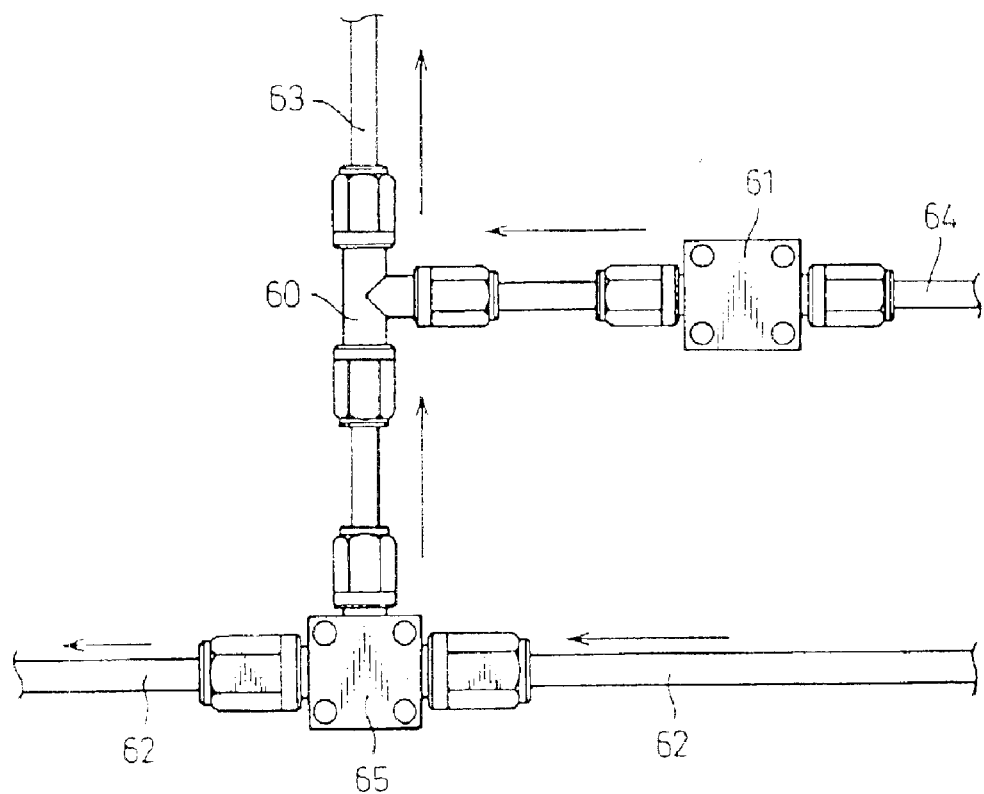
FIG. 18 is an external appearance view showing a prior art branched supply line for a chemical liquid using three-way valves.

In the conventional art described as the above, an external appearance view of a branched supply line for chemical liquid where the third embodiment is used is shown in FIG. 8. As can be seen from the drawing, comparing the arrangement in FIG. 8 with the conventional lines shown in FIGS. 17 and 18, the number of the valves and T-pipes can be reduced, that is, one valve according to this embodiment is sufficient to meet the requirements. Thus, the piping line can be simplified, the piping space is small, and the execution of work can be easily performed.

FIG. 7 is a plan view of only a body 1 showing a fourth embodiment of the present invention. This embodiment is constructed such that in the embodiment of FIG. 6 the secondary flow passage 9 is arranged to penetrate the body 1 parallel to the main passage 8. The operation of this embodiment will be explained below. Now, in the case that the communicating port 12 on the main flow passage side is opened and the communicating port 13 on the secondary flow passage side is closed, the fluid flowing in the main flow passage 8 passes through the valve chamber 14 on the main flow passage side in addition to the main flow passage 8, and flows to the side of the branched flow passage 10. Also, if the communicating port 12 on the main flow passage side is closed and the communicating port 13 on the secondary flow passage side is opened, the fluid in the main flow passage 8 flows in only the main flow passage 8. In this condition, if a cleaning liquid, for example, is flowed in the secondary flow passage 9, the cleaning liquid flows out through the secondary flow passage 9 while being discharged from the branched flow passage 10 through the valve chamber 13 on the secondary flow passage side, the connecting flow passage 11 and the valve chamber 14 on the main flow passage side.

Next, embodiments of a second invention of the present inventions will be explained below with reference to FIGS. 9 to 16.

Figure 9:
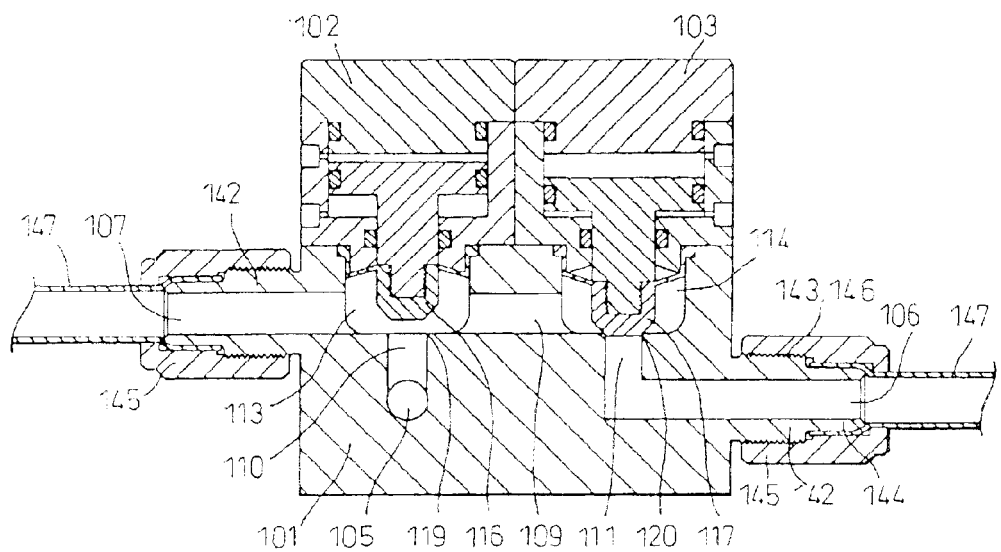
FIG. 9 is a cross section along A—A line in FIG. 12 where three actuators are fixed to the body, and a longitudinal cross section showing the condition where a main flow passage side of a manifold valve according to a second invention is opened and a secondary flow passage side is closed.
Figure 10:
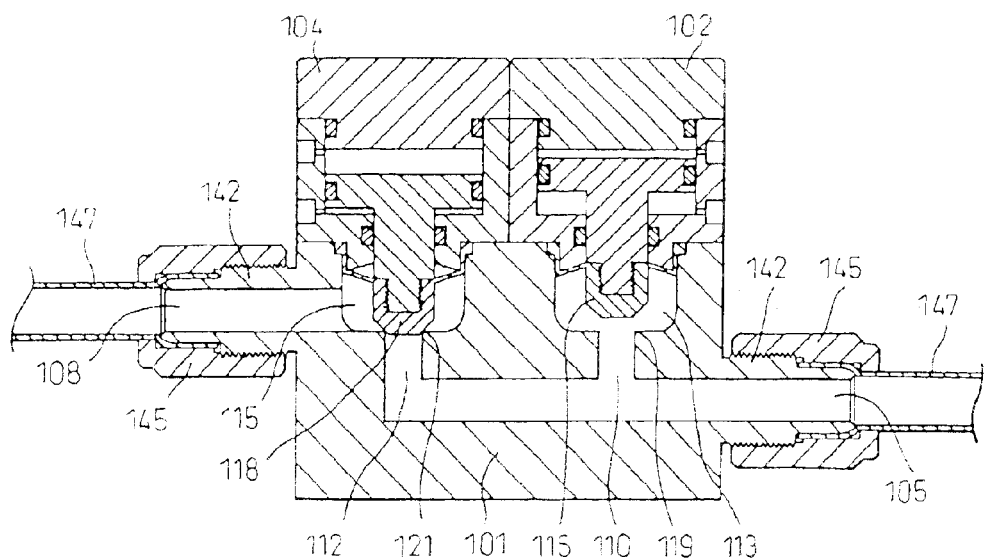
FIG. 10 is a cross section along B—B line is FIG. 12 where three actuators are fixed to the body, and a longitudinal cross section showing the condition where a main flow passage side of a manifold valve according to the second invention is opened and a circulation flow passage side is closed.
Figure 11:
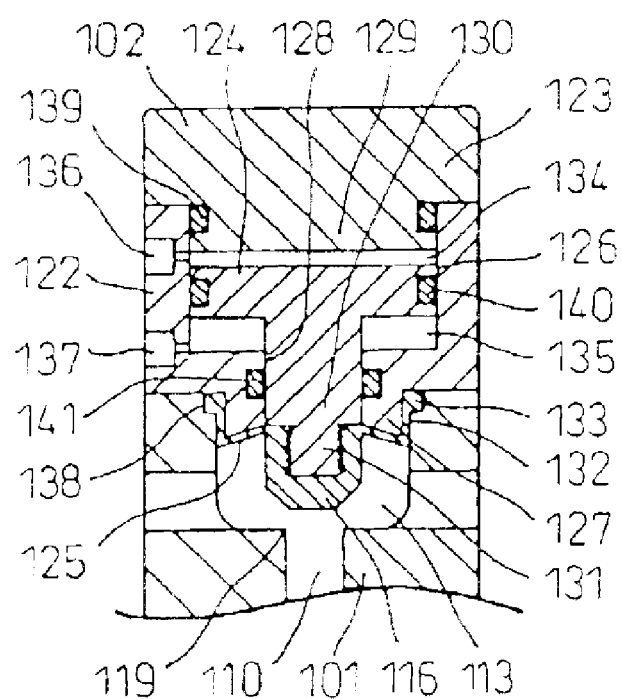
FIG. 11 is a longitudinal cross section of an actuator.
Figure 12:
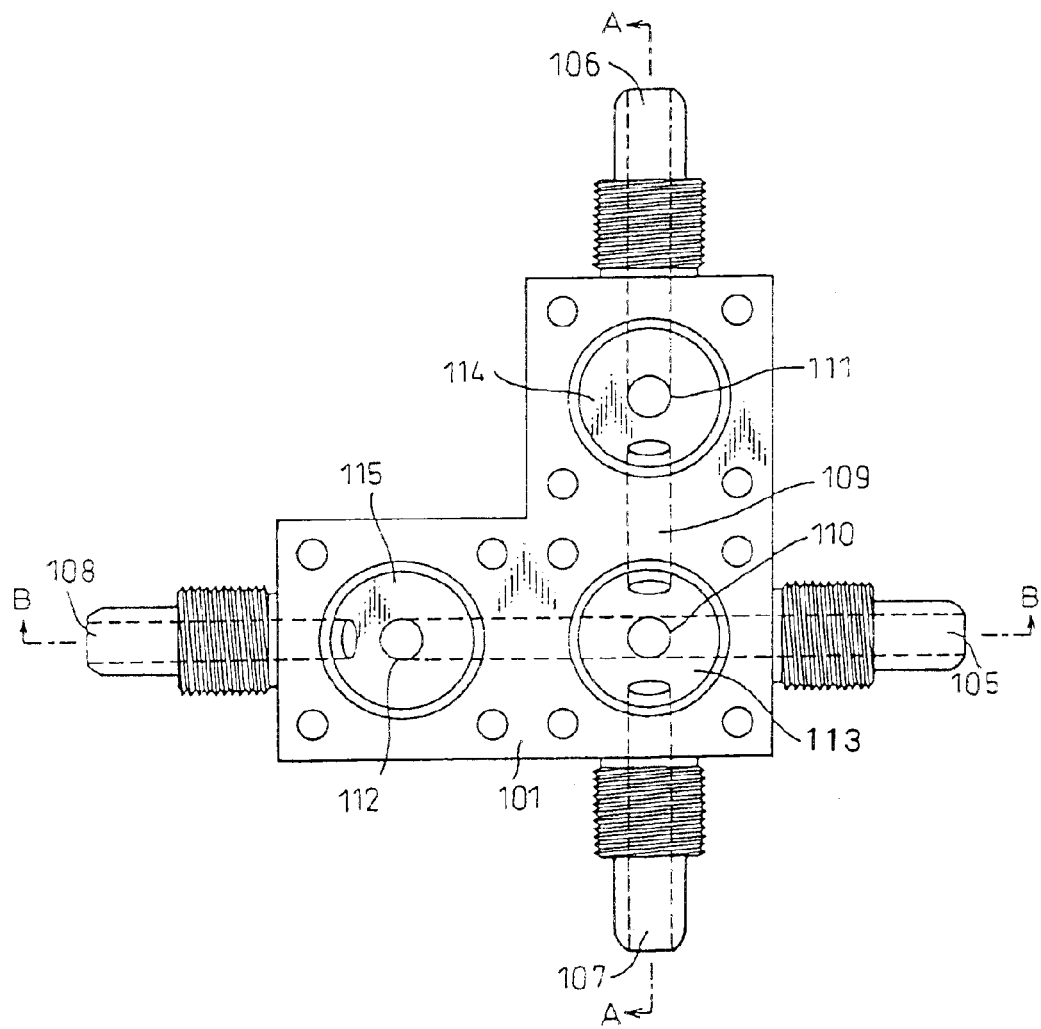
FIG. 12 is a plan view of only a body showing a first embodiment of the second invention.
Figure 13:
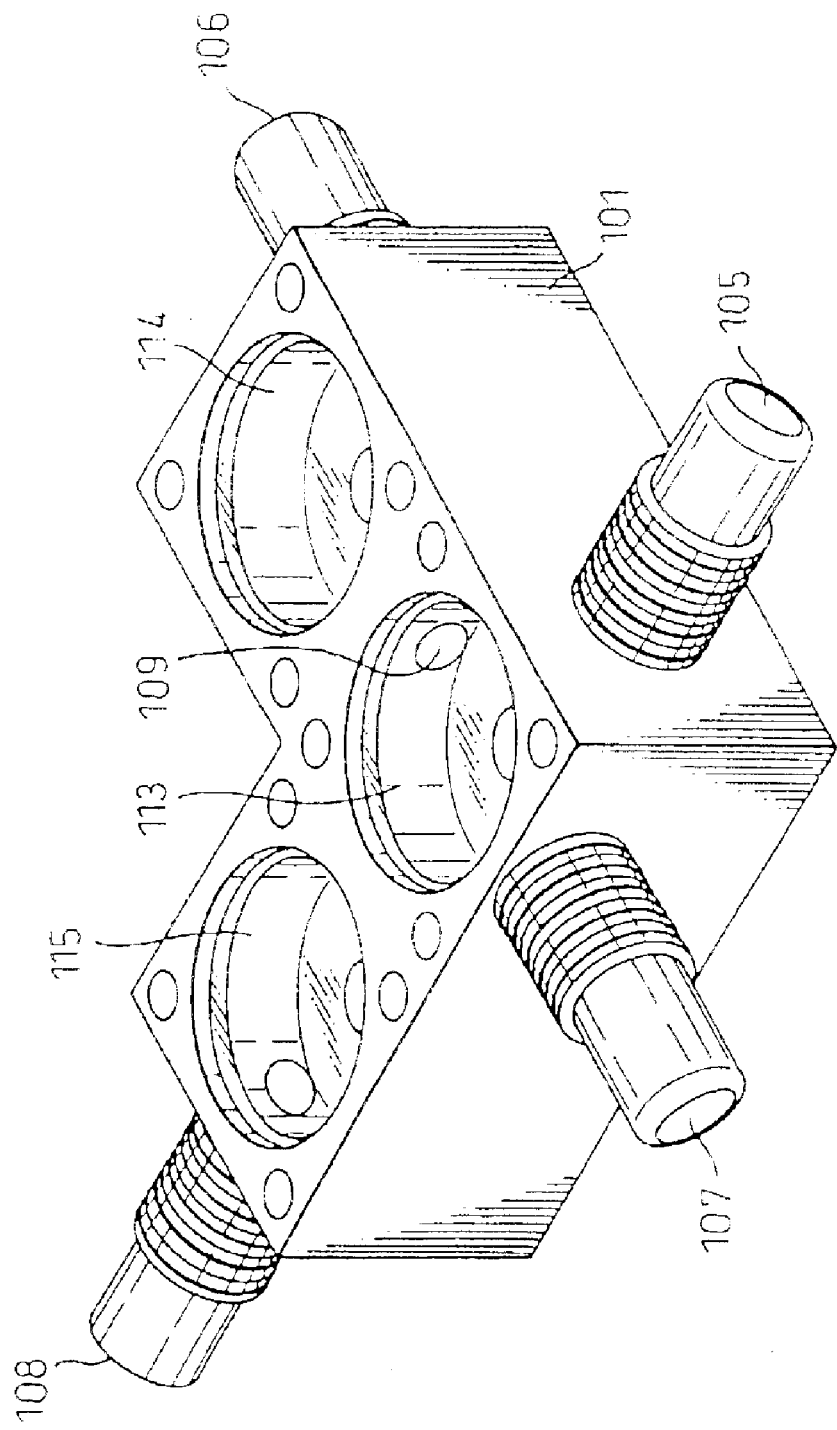
FIG. 13 is a perspective view of the body in FIG. 12.
Figure 14:
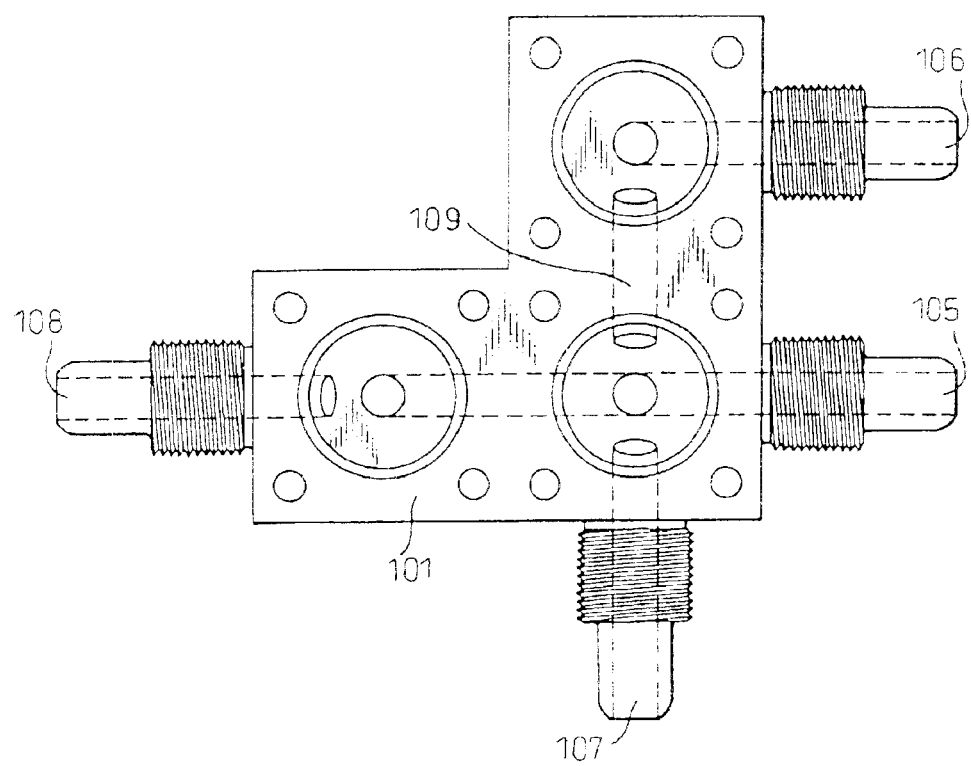
FIG. 14 is a plan view of only a body showing a second embodiment of the second invention.

FIG. 9 is a cross section along A—A line in FIG. 12 showing a first embodiment where three actuators are fixed on a body, a main flow passage side being opened and a secondary flow passage side being closed in a manifold valve according to the present invention. FIG. 10 is a cross section along B—B line of FIG. 12 where three actuators are fixed on the body, a main flow passage side being opened and a circulating flow passage side being closed. FIG. 11 is a cross section of the actuator. FIG. 12 is a plan view of a body of a manifold valve according to the second invention. FIG. 13 is a cubic perspective view of the body in FIG. 12. FIG. 14 is a plan view of a body in a second embodiment of a manifold valve according to the second invention.

In the drawings, reference numeral 101 designates a body on the upper portion of which a cylindrical valve chamber 113 on a main flow passage side, a valve chamber 114 on a secondary flow passage side and a valve chamber 115 on a circulating flow passage side are arranged, and the valve chamber 113 on the main flow passage side and the valve chamber 114 on the secondary flow passage side are communicated with each other by a connecting flow passage 109. Reference numeral 105 designates a main flow passage which communicates with a communicating port 110 on the main flow passage side and a communicating port 112 on the circulating flow passage side arranged on the center of the bottom of the valve chamber 115 on the circulating flow passage side. Reference numeral 106 designates a secondary flow passage which communicates with a communicating port 111 on the secondary flow passage side arranged on the center of the bottom of the valve chamber 114 on the secondary flow passage side. Reference numeral 107 designates a branched flow passage communicated with the valve chamber 113 on the main flow passage side and located on the opposite side to the secondary flow passage 106 in relation to the body 101. Reference numeral 108 designates a circulating flow passage communicated with the valve chamber 115 on the circulating flow passage side and located on the opposite side to the main flow passage 105 in relation to the body 101. The bottom surfaces of the branched flow passage 107, the valve chamber 113 on the main flow passage side, the connecting flow passage 109 and the valve chamber 114 on the secondary flow passage side are arranged to be flush with each other and, similarly, the bottom surfaces of the circulating flow passage 108 and the valve chamber 115 on the circulating flow passage side are also arranged to be flush with each other. Thus, there is no fluid stagnating area in the body. As can be seen in FIGS. 9, 10 and 12, the main flow passage 105 is arranged in a direction which perpendicularly intersects the secondary flow passage 106, the branched flow passage 107 and the connecting flow passage 109, and which is parallel to the circulating flow passage 108. That is, the secondary flow passage 106, the branched flow passage 107 and the connecting flow passage 109 are arranged parallel to each other. Also, the respective opening edges or peripheries of the communicating ports 110, 111 and 112 on the sides of the main flow passage 110, the secondary flow passage 111 and the circulating flow passage 112 are formed with valve seat portions which the valve bodies 116, 117 and 118 of the actuators 102, 103 and 104 are pressed against and separated from. The diameter of the valve chamber 113 on the main flow passage side is larger than those of the communicating port 110 on the main flow passage side and the valve body 116, and similarly the diameter of the valve chamber 114 on the secondary flow passage side is larger than those of the communicating port 111 on the secondary flow passage side and the valve body 117. Also, similarly, the diameter of the valve chamber 115 on the circulating flow passage side is larger than those of the communicating port 112 on the circulating flow passage side and the valve body 118.

In this embodiment, coupling portions 142 are integrally formed to project from the sides of the body 101, into which the main flow passage 105, the secondary flow passage 106, the branched flow passage 107 and the circulating flow passage 108 are respectively extended. In order to connect a piping tube 147 to the coupling portion 142 having the secondary flow passage 106 thereinside, first the piping tube 147 is fitted on a tip 144 of the coupling portion 142, then a female screw 146 of a cap nut 145 is screwed with a male screw 143 onto the outer periphery of the coupling portion 142 to clamp and fix the end of the piping tube 147. The piping tubes 147 are also connected to the main flow passage 105, the branched flow passage 107 and the circulating flow passage 108 in the same manner. Further, the connecting construction of the body 101 and the piping tubes 147 is not limited to this embodiment, and thus the other general connecting constructions may be adopted.

The actuators 102, 103 and 104 are fixed to the upper portion of the body 101 by penetrating bolts/nuts (not shown). Since these three actuators have the same construction, the actuator 102 will be representatively explained below.

In FIG. 11, reference numeral 122 designates a cylinder body inside which a cylindrical cylinder portion 126 is provided and on the lower surface of which a cylindrical projection 127 is provided, and a through-hole 128 is provided to penetrate the projection 127 from the center of the bottom of the cylinder portion 126. An O-ring 141 is fitted on the inner periphery of the through-hole 128. Further, on the side surface of the cylinder body 122 are provided a pair of supply ports 136, 137 for an actuating fluid, which are respectively communicated with the upper and lower portions in the cylinder portion 126.

Reference numeral 123 designates a cylinder cover having, at the lower portion thereof, a cylindrical projection 129 on the periphery of which an O-ring 139 is fitted, the cylindrical projection 129 being joined to the cylinder body 122 by inserting the cylindrical projection 129 into the upper portion of the cylinder portion 126 via the O-ring 139. In this embodiment, these body 101, cylinder body 122 and cylinder cover 123 are fixed by penetrating bolt/nuts(not shown).

Reference numeral 124 designates a piston on the outer periphery of which an O-ring 140 is fitted, the piston 124 being slidably fitted in the cylinder portion 126 via the O-ring 140 and moving upward and downward. On the center of the lower end of the piston is integrally provided a rod portion 130 which slidably projects through the through hole 128 of the cylinder body 122, and on the tip portion of the rod portion 130 is provided a joining portion 131 to which the valve body 116 of a diaphragm 125 is joined. Also, an upper space 134 is defined by the upper surface of the piston 124, the inner periphery of the cylinder portion 126 and the lower surface of the cylinder cover 123, and a lower space 135 is defined by the lower surface of the piston 124, the outer periphery of the rod portion 130, and the inner periphery and the bottom surface of the cylinder portion 126.

Reference numeral 125 designates a diaphragm on the center of the lower surface of which is integrally provided a valve body 116 which is pressed against and separated from a valve seat portion 119 provided on the center of the lower surface of the body 1, i.e., the opening edge of the communicating port 110 on the main flow passage side, the valve body 116 being joined to the tip of the rod portion 130 of the piston 124 by screwing. On the outer periphery of the diaphragm 125 is provided a cylindrical membrane 132, on the outer periphery of the upper end of which an annular projection 133 is provided. The cylindrical membrane 132 is clamped by the inner periphery of the valve chamber 113 on the main flow passage side of the body 101 and the outer periphery of the projection 127 of the cylinder body 122 and, further, the annular projection 133 is fitted in a step portion 138 arranged on the upper portion of the inner periphery of the valve chamber 113 on the main flow passage side as well as being clamped and fixed by the inner periphery of the valve chamber 113 on the main flow passage side of the body 101 and the outer periphery of the projection 127 of the cylinder body 122. The configuration of the diaphragm 125 is not limited to this embodiment, and thus all of the configurations having a membrane clamped by the body 1 and the cylinder body 122 may be used, and a bellows type configuration also may be used.

Further, as for the construction of the actuator, a construction inside which a spring etc. is installed may be used, as long as it has valve bodies which respectively open and close the communicating ports on the sides of the main flow passage, the secondary flow passage and the circulating flow passage, and thus the construction of the actuator is not limited to this embodiment. Also, although it is preferable that the actuators having these valve bodies are separately installed on the main flow passage side, the secondary flow passage side and the circulating flow passage side, these three actuators may be integrally arranged and thus the installation of the actuators are not especially limited.

Further, as materials for the body etc. fluororesin, such as polytetrafluoroethylene (hereinafter, referred to as PTFE) or tetraflouroethylene-perfluoroalkylvinylether copolymer (hereinafter referred to as PFA) may be preferably used, since fluororesin dissolves out less impurities, however, the other plastics such as polyvinylchloride or plolypropylene, and metal may be used, and thus the materials for the body etc. are not especially limited. Also, although as a material for the diaphragm, fluororesin such as PTFE or PFA is preferably used, rubber and metal may be used, and thus the materials are not especially limited.

Next, the operation of the manifold valve according to this embodiment will be explained below.

Further, as the operations of these actuators 102, 103 and 104 are the same, the operation of the actuator 102 will be representatively explained.

Now, in the condition where the communicating port 110 on the main flow passage side is opened as shown in FIG. 9, if the actuating fluid (for example, a compressed air) is poured into the upper space 134 through the actuating fluid supply port 136 of the actuator 102 from the outside of the cylinder body, the piston 124 is pushed downward by the pressure of the actuating fluid so that the rod portion 130 joined to the piston is drawn downward and the valve body 116 joined to the lower end of the rod portion 130 is pressed against the valve seat portion 119, whereby the communicating port 110 on the main flow passage side is closed. In this case, the fluid flowing in the main flow passage 105 is shut off in connection with FIG. 10. Conversely, in the condition where the communicating port 110 on the main flow passage side is closed, if the actuating fluid is poured into the lower space 135 from the actuating fluid supply port 137 of the actuator 102, the piston 124 is pushed upward by the pressure of the actuating fluid so that the rod portion 130 joined to the piston is drawn upward and the valve body 116 joined to the lower end of the rod portion 130 is separated from the valve seat portion 119, so that the communicating port 110 on the main flow passage side is opened. That is, the fluid flowing in the main flow passage 105 flows out toward the branched flow passage 107.

For example, if the valve according to this embodiment is used a pipe line in which a slurry is supplied from the main flow passage 105 and a cleaning liquid is supplied from the secondary flow passage 106 and then the slurry and the cleaning liquid are discharged from the branched flow passage 107 to discharge the fluid (here the slurry) in the main flow passage 105 from the circulating flow passage 108 and to circulate or dispose of the slurry, the slurry passes through the valve chamber 113 on the main flow passage side and is discharged from the branched flow passage 107, but the slurry is stagnated in the connecting flow passage 109 and the valve chamber 114 on the secondary flow passage side in the condition of FIGS. 9 and 10. However, in this condition, if the communicating port 110 on the main flow passage side is closed, the communicating port 111 on the secondary flow passage side is opened, and the cleaning liquid flows from the secondary flow passage 106 and the stagnated slurry is discharged from the branched flow passage 107 so that the cleaning in the valve can be carried out. Also, the circulating and shutting off of the fluid within the main flow passage can be carried out by opening and closing the communicating port 112 on the cycling flow passage side. In this embodiment, as the bottom surfaces of the branched flow passage 107, the valve chamber 113 on the main flow passage side, the connecting flow passage 109 and the valve chamber 114 on the secondary flow passage side are designed to be flush with each other, as described in the above, and since similarly the bottom surfaces of the circulating flow passage 108 and the valve chamber 115 on the circulating flow passage side are also designed to be flush with each other, the volume of the stagnating area is very small and, as the respective flow passages are formed linearly, the pressure loss is low and, thus, superior cleaning effects can be obtained.

FIG. 12 is a plan view of only a body of the manifold valve according to the present invention.

FIG. 13 is a cubic perspective view of FIG. 12 shown for reference.

FIG. 14 is a plan view of only a body 101 showing a second embodiment of the present invention.

The difference from the first embodiment is that the secondary flow passage 106 is arranged parallel to the main flow passage 105 and on the same side of the body 101. As for the operation, the flowing direction of the fluid flowing in the secondary flow passage 106 is only changed to a direction perpendicular to the connecting flow passage 109, and as the operation is similar to the first embodiment, the explanation of the operation will be omitted.

Figure 15:
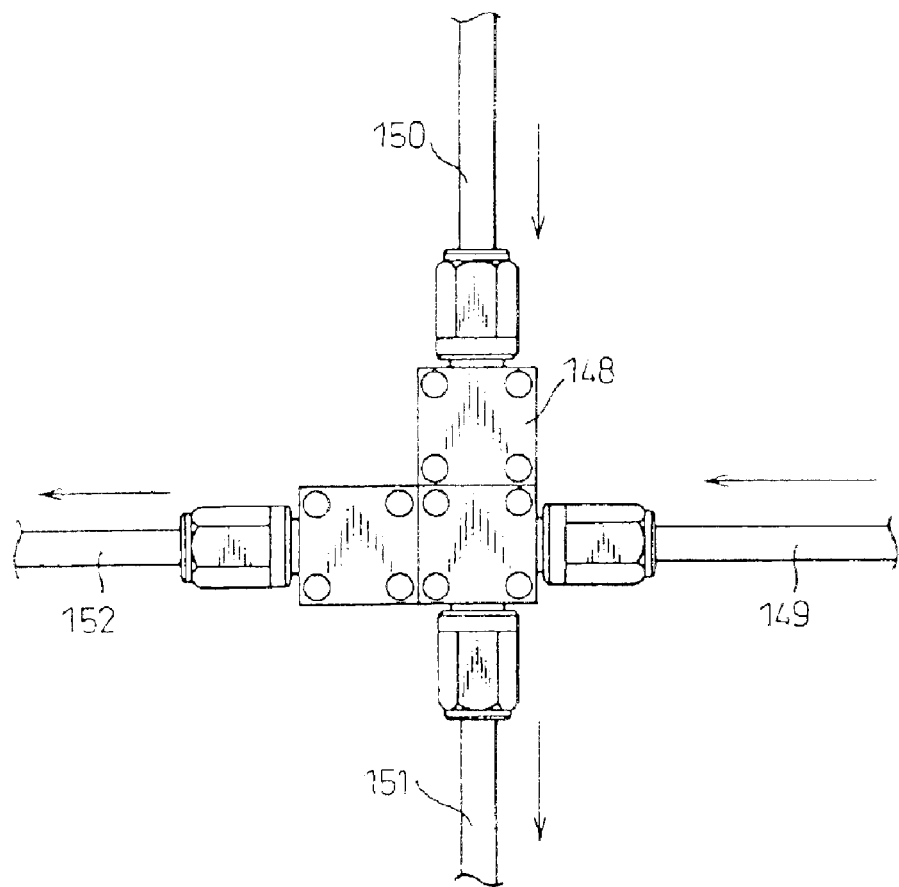
FIG. 15 is an external appearance view showing a branched fluid supply line using the first embodiment of the second invention.
Figure 19:
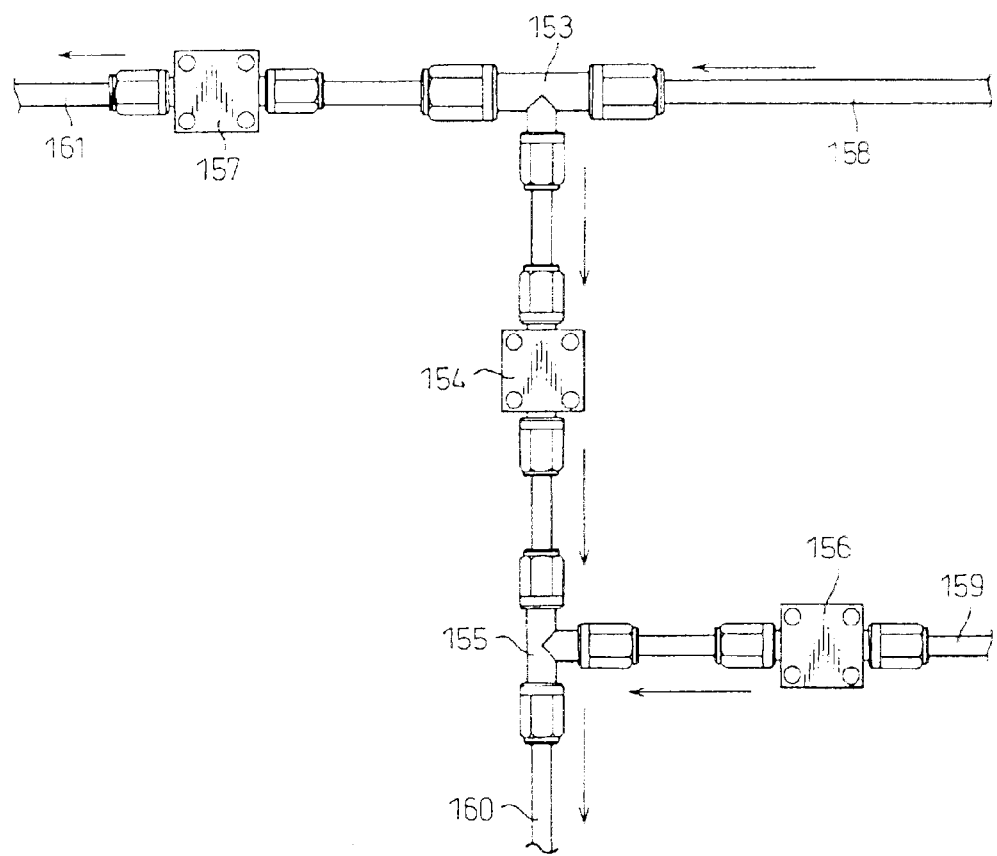
FIG. 19 is an external appearance view showing a prior art branched supply line for a chemical liquid using two-way valves.
Figure 20:
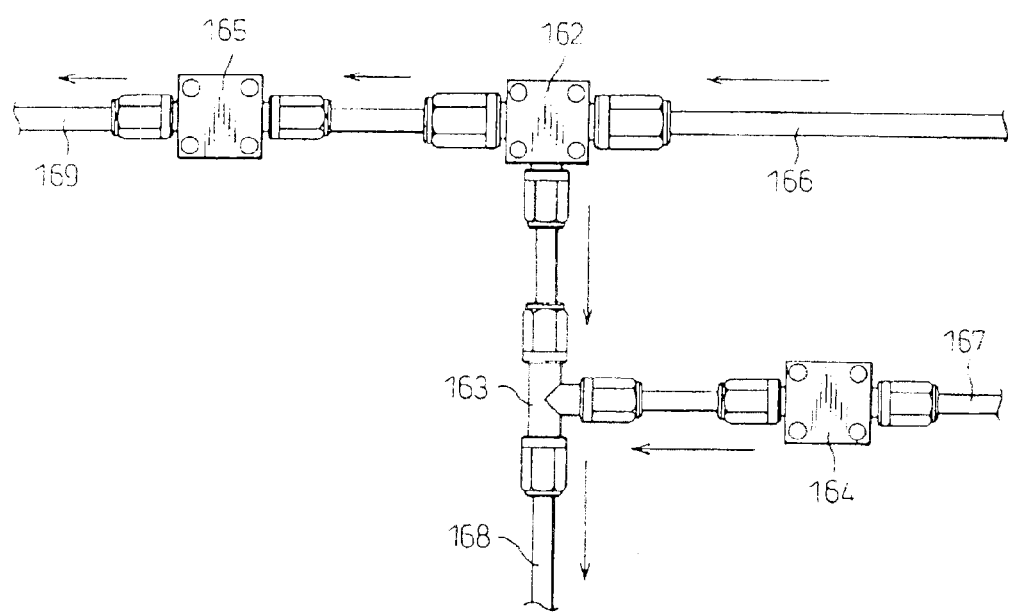
FIG. 20 is an external appearance view showing a prior art branched supply line for a chemical liquid using three-way valves.

FIG. 15 shows an external appearance view where the valve according to the first embodiment of the second invention is used in the conventional line. It shows directions of the fluid in the condition where the communicating port on the main flow passage side is closed and the communicating ports on the secondary flow passage side and the circulating flow passage side are opened in FIGS. 9, 10. As can be seen from the drawing, comparing with the conventional lines shown in FIG. 19 and FIG. 20, the number of the valves and T-pipes can be reduced, that is, one valve according to this embodiment is sufficient to meet the requirements. Thus, the piping line can be simplified, the piping space is remarkably small, and the execution of work can be easily performed.

Figure 16:
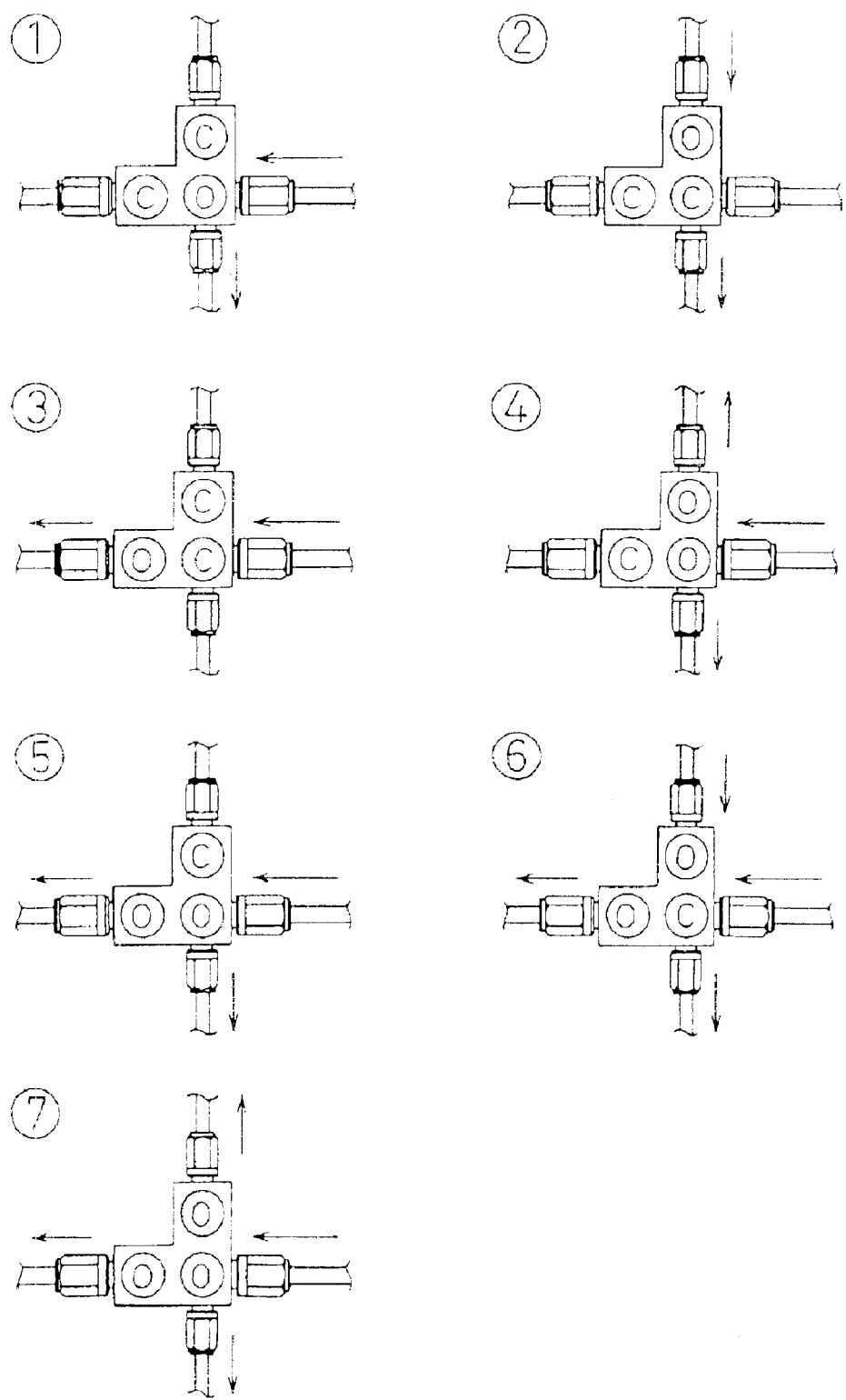
FIG. 16 is an external appearance view showing the flow of fluid according to the combination of the opening and closing of the respective communicating ports in the branched fluid supply line using the first embodiment of the second invention, and further mark ○ designates an opened valve and mark © designates a closed valve.

FIG. 16 shows the directions of the fluid in the condition where the opening and closing of the respective communicating ports are combined, as considered by concentrating the observation on the fluid flow in the main flow passage (including the above explanation). It is apparent that the valve can be used to change the direction of the fluid if necessary, thus the valve is very useful.

The manifold valve according to the present invention has a construction as explained above and thus the following superior effects are obtained by using it.

(1) In the case that the cleaning liquid flows from the secondary flow passage in the condition where the valve on the main flow passage side is closed and the valve on the secondary flow passage side is opened, residual chemical liquid etc. can be effectively cleaned and discharged because the flow passages are linear and the bottom surfaces of the flow passages are flush with each other and, as a result, the cleaning time for the flow passages in the manifold valve can be greatly shortened.

(2) In the case that the main flow passage and the secondary flow passage are arranged to penetrate the body, even if the communicating ports on the sides of the main flow passage and the secondary flow passage are closed, the respective fluids can be retained to flow or circulate, thus the manifold valve of the invention can be also used for the fluid having high precipitation characteristic, such as a slurry.

(3) As the valve has been provided on the circulating flow passage side, the fluid flowing in the main flow passage can be freely circulated or shut off and, thus, the manifold valve of the invention can be also used for a fluid with a high precipitation characteristic, such as a slurry.

(4) As three actuators operate independently, the manifold valve of the invention can be used for various applications.

(5) As the construction of the manifold valve is compact, the number of the valves and the T-pipes in the piping line can be reduced comparing with the conventional manifold valve and, thus, the piping line can be simplified, the piping space is greatly smaller, and the execution of works can be easily performed.

(6) Because fluororesin, such as PTFE or PFA etc., is used for the materials of the body and the diaphragm, the chemical resistance is improved and the elution of impurities is a little. The manifold valve of the invention can be preferably used for a superdemineralized water line in the semiconductor industry and for various chemical lines.

What is claimed is:

1. A manifold valve comprising a body having a valve chamber on a main flow passage side and a valve chamber on a secondary flow passage side, which valve chambers are communicated with each other by a connecting flow passage having a bottom surface portion, a main flow passage communicated with a communicating port on the main flow passage side arranged on the center of a bottom surface portion of the valve chamber on the main flow passage side, a branched flow passage communicated with the valve chamber on the main flow passage side and having a bottom surface portion, and a secondary flow passage communicated with a communicating port on the secondary flow passage side arranged on the center of a bottom surface portion of the valve chamber on the secondary flow passage side; and actuators having valve bodies for opening and closing the communicating port on the main flow passage side and the communicating port on the secondary flow passage side, respectively, wherein the respective bottom surface portions of the connecting flow passage, the branched flow passage, the valve chamber on the main flow passage side, and the valve chamber on the secondary flow passage side are flush with one another.

2. A manifold valve, as set forth in claim 1, wherein the branched flow passage and the connecting flow passage are arranged in a direction perpendicularly intersecting the main flow passage, and the secondary flow passage is arranged parallel to the branched flow passage.

3. A manifold valve, as set forth in claim 2, wherein the main flow passage is arranged on one side of the body or to penetrate the body.

4. A manifold valve, as set forth in claim 2, wherein the secondary flow passage is arranged on one side of the body or to penetrate the body.

5. A manifold valve, as set forth in claim 1, wherein the branched flow passage and the connecting flow passage are arranged in a direction perpendicularly intersecting the main flow passage, and the branched flow passage is arranged parallel to the main flow passage.

6. A manifold valve, as set forth in claim 5, wherein the main flow passage is arranged on one side of the body or to penetrate the body.

7. A manifold valve, as set forth in claim 5, wherein the secondary flow passage is arranged on one side of the body or to penetrate the body.

8. A manifold valve, as set forth in claim 1, wherein the main flow passage is arranged on one side of the body or to penetrate the body.

9. A manifold valve, as set forth in claim 1, wherein the secondary flow passage is arranged on one side of the body or to penetrate the body.

10. A manifold valve as set forth in claim 1, further including a valve chamber on a circulating flow passage side, a communicating port on the circulating flow passage side arranged on the center of the bottom of the valve chamber on the circulating flow passage side, a circulating flow passage communicated with the valve chamber on the circulating flow passage side, and an actuator fixed on the upper portion of the body and having a valve body for opening or closing the communicating port on the circulating flow passage side, wherein a bottom surface portion of the circulating flow passage is flush with the bottom surface portion of the valve chamber on the circulating flow passage side.

11. A manifold valve, as set forth in claim 10, wherein the branched flow passage, the connecting flow passage and the secondary flow passage are arranged in a direction perpendicularly intersecting the main flow passage.

12. A manifold valve, as set forth in claim 10, wherein the branched flow passage and the connecting flow passage are arranged in a direction perpendicularly intersecting the main flow passage, and the secondary flow passage is arranged parallel to the main flow passage.

* * * * *